UNITED STATES PATENT OFFICE.

JOHN MURPHY, OF NEW YORK, N. Y.

IMPROVEMENT IN TREATING WASTE AND INFERIOR GUMS.

Specification forming part of Letters Patent No. 26,698, dated January 3, 1860.

*To all whom it may concern:*

Be it known that I, JOHN MURPHY, of the city, county, and State of New York, have invented a new and useful method of utilizing inferior qualities of the vulcanizable gums and the scraps of the hard compounds thereof; and I do hereby declare that the following is a full, clear, and exact description of the same.

Some varieties of the vulcanizable gums—as, for example, the poorer kinds of gutta-percha—are of such a character that they swell and blister in the process of vulcanization, so that when they are compounded with sulphur alone in the ordinary way and vulcanized the product is practically valueless. Gums of this quality have gradually accumulated in the market and are sold at extremely low prices, from the fact that heretofore they could not be made available for vulcanization by any known process. On the other hand, great difficulty has been experienced in the manufacture of thick slabs, blocks, and large masses of hard vulcanized compounds from gums even of the best quality on account of the softening, blistering, and running of the compound during the process of vulcanization, and although attempts have been made to overcome this difficulty by the admixture with the gum of earthy substances—as, for example, the silicate of magnesia and the carbonates of lead and zinc—their employment is attended with the disadvantage that the compound produced is not susceptible of as high a polish as that made by the use of gum and sulphur alone, and is also deficient in strength, so that it cannot be used with advantage for a variety of purposes to which it would otherwise be applicable.

The object of my invention is to enable the poorer varieties of the vulcanizable gums to be used with advantage, and to permit solid slabs, blocks, and masses of hard compound to be formed of any desirable size and thickness without the employment of any other elementary substances than gum and sulphur.

My invention also furnishes a profitable means of working up the scraps produced in the manufacture of finished articles from slabs, blocks, and masses of the hard compounds of vulcanizable gums. Such scraps have gradually accumulated, and are accumulating, in large quantities at the manufactories from the want of some practical means of using them to advantage.

My invention consists in a mode of manufacture or process comprising the following operations, viz: First, the manufacture of hard stock out of a vulcanizable gum by compounding or blending it with sulphur or its equivalent and vulcanizing the compound until it is hard; second, the reducing of the hard stock to powder by grinding it in a heated state between rollers, or by any other means which will produce this result; third, the compounding of the ground hard stock with a quantity of raw gum, (by which I mean gum that has never been vulcanized,) by which operation a new vulcanizable compound is produced that may be formed into sheets, blocks, and masses of any desired form and size; fourth, the vulcanization of the new compound thus formed.

The proportions in which the sulphur and gum are blended in carrying out my invention may be varied as circumstances may render expedient, as may also the proportion of the hard stock used in the third operation. The machinery for blending and grinding and the means for completing the vulcanization may also be varied. I prefer, however, to use the ordinary grinding-mill, consisting of two hot horizontal rollers revolving with different velocities, both for blending and grinding, and to effect the change commonly called "vulcanization" by heating the vulcanizable compounds in an ordinary steam-heater. As these means are well known in the art to which this invention appertains, I do not deem it necessary to describe them in detail in this specification.

In manufacturing hard stock from raw gum, whether of good or inferior quality, I take the gum after it has been cleansed from foreign matters in the usual way and grind or knead the same in a heated state with sulphur until the two are thoroughly blended and formed into a putty-like mass. The proportions in which the two materials are used are thirty pounds of gum and from fifteen to forty pounds of sulphur, as may be found necessary, according to circumstances, the larger quantity of sulphur being employed when the hard stock produced is to be blended at the third operation with a large proportion of raw gum without additional sulphur, or when the vulcanized compound is required to possess great hardness.

The putty-like mass produced may be formed either by hand or by the assistance of suitable machinery into sheets, slabs, or masses of any desirable form and size that may be most convenient for vulcanizing, and are then vulcanized, which operation is readily accomplished by placing them in the tanks of a steam-heater, covering them with water, and submitting them to the action of steam in the usual manner. The steam-heat is maintained until the compound is vulcanized so as to be sufficiently hard, which I find takes place in from four to eight hours, when steam of a temperature of 290° of Fahrenheit's thermometer is used, the length of time varying with the proportion of sulphur in the compound, the compounds containing smaller proportions of sulphur requiring more time to vulcanize them than those containing larger proportionate quantities of sulphur. After the vulcanization is completed, the hard stock produced is ready for the second operation or step of my process.

The best mode with which I am acquainted of accomplishing the second step of my process is to break the hard stock into fragments by hand or other means, to heat them after being broken, and to grind them in a hot-roller mill. A convenient means of heating the fragments is to place them upon an ordinary steam table or heater, and to place a cover over them to retain the heat. The grinding is then readily effected by passing the hot fragments between the hot rollers of a roller-mill, such as is commonly used for grinding india-rubber and gutta-percha with and without sulphur and other materials. This grinding constitutes the second step of my process, and although the ordinary roller-mill may be used for the purpose, it is expedient to employ a mill of double the usual strength, so that the operation may be performed with rapidity.

In accomplishing the third step of my process a new vulcanizable compound is formed by blending the ground stock resulting from the second operation with raw gum. The proportions in which the materials are blended may be varied according to their qualities, or the nature of the product required, or both, it being understood that the hard stock that contains the largest proportion of sulphur can be blended with the largest proportion of raw gum. A good compound for general use consists of three parts, by weight, of ground hard stock formed of equal quantities of gum and sulphur, with one part of raw gum. The material should be thoroughly blended, which may be done efficiently by means of the ordinary hot-cylinder mill. The putty-like mass produced may be formed into blocks, sheets, or slabs, or may be molded into any desirable forms by the methods employed in the manufacture of the vulcanizable compounds of the vulcanizable gums. In whatever form it is put, care should be taken to expel all the air from the mass, so as to prevent blistering in the subsequent step of the process.

The fourth step of my process consists in heating the compound produced by the third operation in such manner as to produce the change commonly called "vulcanization." The best means of effecting this operation with which I am acquainted is to place the articles formed of the compound in the tanks of a steam-heater to cover them with water, and to subject them to the action of high steam while closed up in the heater. The steam should be admitted into the heater at a temperature of from 280° to 300° of Fahrenheit's thermometer, the operation being continued from four to eight hours, according to circumstances, it being understood that the compounds which contain the lowest proportions of sulphur require the longest time to produce the change, and that with equal heats the compounds that contain most sulphur will vulcanize the hardest; also, that the longer the operation is continued the greater will be the hardness of the product. As a general rule, I find that an exposure to a steam-heat of 290° of Fahrenheit for five hours will produce a proper vulcanization of the compound having the proportions particularly specified in the foregoing description of the third operation of my process.

Having thus described a practical means of carrying out my invention, I wish it to be understood that it is not confined to any particular means or method of accomplishing any one of its separate steps, as these may be varied as circumstances render expedient; neither is it confined to the employment of hard stock prepared specially for the purpose out of raw gum, as the scraps produced in the manufacture of articles from the ordinary hard compounds of the vulcanizable gums may be employed in place of such stock, for they have already undergone the first step of my process and are ready for the subsequent operations.

My invention, also, is not limited to the employment at the third operation of ground hard stock and raw gum alone to the exclusion of other materials, as circumstances arise in the course of manufacture in which an admixture of one other material may be necessary. Thus, if but a small proportion of ground stock is to be combined with a large proportion of raw gum, an additional quantity of sulphur should be blended with them sufficient to insure the vulcanization of the raw gum; and, on the other hand, if for any reason the hard stock has been manufactured with just sufficient sulphur to produce its vulcanization, an additional quantity of sulphur is required at the third step of the process in order that the product obtained at the fourth step may be sufficiently hard.

Various earthy materials may also be incorporated with the compound in the process of manufacture; but the employment of such materials is objectionable for the reason before mentioned.

I do not claim the separate operations of my process independently of their combination; but

What I claim as my invention, and desire to secure by Letters Patent, is—

The process herein described for manufacturing the vulcanizable compounds of vulcanizable gums, consisting of the following operations, viz: first, the manufacture of hard stock of the vulcanizable gum by blending it with sulphur or its equivalent, and vulcanizing the compound until it is hard; second, the reduction of the hard stock to powder; third, the formation of a compound of the ground stock and raw gum by blending the two together; fourth, the vulcanization of the compound formed by the preceding operations, the several operations constituting the process being effected in the order herein stated.

In testimony whereof I have hereunto subscribed my name.

JOHN MURPHY.

Witnesses:
H. J. HALE,
WILLIAM RIDER.